(12) United States Patent
Schill

(10) Patent No.: US 8,169,805 B2
(45) Date of Patent: May 1, 2012

(54) METHOD OF OPERATING AN INVERTER BY TURNING OFF THE SWITCHING AROUND A ZERO TRANSITION OF THE OUTPUT VOLTAGE

(75) Inventor: Christoph Schill, Ravensburg (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 752 days.

(21) Appl. No.: 12/244,276

(22) Filed: Oct. 2, 2008

(65) Prior Publication Data

US 2009/0103339 A1 Apr. 23, 2009

(30) Foreign Application Priority Data

Oct. 19, 2007 (DE) .................. 10 2007 050 450
Dec. 5, 2007 (DE) .................. 10 2007 058 633

(51) Int. Cl.
*H02M 3/24* (2006.01)
*H02M 7/44* (2006.01)
(52) U.S. Cl. ........................ 363/97; 363/131
(58) Field of Classification Search .......... 363/78, 363/79, 95, 97, 98, 131, 132
See application file for complete search history.

(56) References Cited

U.S. PATENT DOCUMENTS

| 4,725,740 | A | 2/1988 | Nakata |
| 5,021,936 | A | 6/1991 | Nishizawa et al. |
| 5,442,276 | A * | 8/1995 | Schwartz et al. ........... 322/25 |
| 7,411,802 | B2 | 8/2008 | Victor et al. |
| 2008/0259662 | A1 * | 10/2008 | Hsu et al. ............... 363/95 |

FOREIGN PATENT DOCUMENTS

| DE | 102 21 592 A1 | 12/2003 |
| EP | 0 284 021 B1 | 9/1988 |
| EP | 1 626 494 A2 | 2/2006 |

* cited by examiner

*Primary Examiner* — Harry Behm
*Assistant Examiner* — Matthew Grubb
(74) *Attorney, Agent, or Firm* — Laurence A. Greenberg; Werner H. Stemer; Ralph E. Locher

(57) ABSTRACT

A method for operating an inverter for converting direct voltage into alternating voltage, having two direct-voltage terminals and two alternating-voltage terminals, between which a plurality of power switching elements clocked at high-frequency are connected. The high-frequency clocking of the power switching elements of the inverter is switched off around a zero transition of the alternating voltage for a period which depends on the direct voltage present at the direct-voltage terminals of the inverter and/or the output power of the inverter, so that no current is generated in time intervals with a poor efficiency at the alternating-voltage terminals of the inverter.

18 Claims, 3 Drawing Sheets

US 8,169,805 B2

METHOD OF OPERATING AN INVERTER BY TURNING OFF THE SWITCHING AROUND A ZERO TRANSITION OF THE OUTPUT VOLTAGE

CROSS-REFERENCE TO RELATED APPLICATION

This application claims the priority, under 35 U.S.C. §119, of German Patent Application DE 10 2007 050 450.2, filed Oct. 19, 2007 and German Patent Application DE 10 2007 058 633.9, filed Dec. 5, 2007; the prior applications are herewith incorporated by reference in their entirety.

BACKGROUND OF THE INVENTION

Field of the Invention

The present invention relates to a method for operating an inverter for converting direct voltage into alternating voltage, having two direct-voltage terminals and two alternating-voltage terminals, between which a plurality of power switching elements clocked at high-frequency are connected.

Inverters are used, for example, for feeding electrical energy into the public power system when only direct-voltage energy sources such as photovoltaic installations, fuel cells or batteries are available. Regardless of their type of construction, all inverters regularly absorb more energy than they deliver. It is an object of many developments of inverters, therefore, to improve their efficiency.

European Patent EP 0 284 021 B1, corresponding to U.S. Pat. No. 5,201,936, describes clock patterns for generating sinusoidal voltage and sinusoidal current for transformerless inverters. Depending on the design of their components, the efficiency of inverters of that type is best within a certain load range. Below and above that load range, the efficiency distinctly drops off.

German Published, Non-Prosecuted Patent Application DE 102 21 592 A1 discloses an inverter in which two additional switches each having one series-connected diode, are used at the output of an inverter bridge. When those switches are opened and closed at the correct time, feeding energy back from the chokes into the buffer capacitor during the commutation of the power switching elements, is avoided. The ripple of the current in the chokes, and thus their losses, become less. However, that circuit configuration requires a large expenditure of components and scarcely improves the efficiency for feeding little energy into the system.

European Patent Application EP 1 626 494 A2, corresponding to U.S. Pat. No. 7,411,802 B2, also has the object of avoiding feeding energy back into the buffer capacitor during the commutation of the power switching elements of the inverter. That is achieved by an additional switch between the buffer capacitor and the inverter bridge which interrupts the line to the buffer capacitor during the commutation. In the remaining time, however, that additional switch must conduct current and, as a result, itself again causes a loss of power. In addition, the efficiency of the inverter is scarcely improved when little energy is fed into the system.

Photovoltaic installations supply fluctuating power to the system in accordance with the fluctuating solar irradiation due to cloud coverage of the sun and diurnal variation. An inverter of a photovoltaic installation is therefore operated both in the range of good efficiency with high power delivery and over long periods in the range of poor efficiency with little power delivery. There is therefore a requirement for an inverter which can be operated effectively even at low power delivery.

SUMMARY OF THE INVENTION

It is accordingly an object of the invention to provide a method for operating an inverter, which overcomes the hereinafore-mentioned disadvantages of the heretofore-known methods of this general type and with which the inverter is effectively operated even in a range of low power delivery.

With the foregoing and other objects in view there is provided, in accordance with the invention, a method for operating an inverter for converting direct voltage into alternating voltage. The method comprises providing two direct-voltage terminals, two alternating-voltage terminals and a plurality of power switching elements clocked at high-frequency and connected between the two direct-voltage terminals and the two alternating-voltage terminals. The high-frequency clocking of the power switching elements of the inverter is switched off around a zero transition of the alternating voltage for a period depending on a direct voltage present at the direct-voltage terminals of the inverter and/or an output power of the inverter.

By switching off the high-frequency clocking of the power switching elements of the inverter around a zero transition of the alternating voltage for a period which depends on the direct voltage present at the direct-voltage terminals of the inverter and/or the output power of the inverter, the operating range of the inverter with little efficiency is blanked out and the inverter is mainly operated in the operating range with good efficiency.

In this context, the invention is based on the following considerations. During high-frequency clocking of the power switching elements, a reactive current which causes a power consumption in corresponding circuit components usually flows in conventional inverters. The power present at the alternating-voltage terminals or fed into a system is proportional to the current. With a low current in the vicinity of the zero transitions, the transmitted power, due to the high-frequency clocking, is low in comparison with the above-mentioned power consumption so that the efficiency is poor in this operating range. With increasing current, this efficiency becomes correspondingly better. The method according to the invention blanks out these ranges with poor efficiency and the power is mainly transmitted in the range having a good efficiency so that the total achieved efficiency of the inverter is also improved.

In accordance with another mode of the invention, the period during which the high-frequency clocking of the power switching elements is switched off around a zero transition of the alternating voltage is selected to be all the longer the lower the output power of the inverter is in the partial-load range of the inverter. In other words, a range with poor efficiency is blanked out which is all the greater the lower the current generated by the inverter or the output power of the inverter is.

In accordance with a further mode of the invention, the power switching elements are activated in the partial-load range of the inverter in such a manner that the current generated at the alternating-voltage terminals changes with the slope of the curve of the voltage present at the alternating-voltage terminals. As an alternative, the power switching elements can also be activated in such a manner that the current generated at the alternating-voltage terminals changes with the slope of the square of the curve of the voltage present at the alternating-voltage terminals.

In accordance with an added mode of the invention, the high-frequency clocking of the power switching elements of the inverter is switched off around a zero transition of the alternating voltage with equally long time intervals for rising and falling edges. As an alternative, the high-frequency clocking of the power switching elements of the inverter can also be switched off around a zero transition of the alternating voltage with differently long time intervals for rising and falling edges.

In accordance with an additional mode of the invention, in the peak-load range of the inverter, the period during which the high-frequency clocking of the power switching elements is switched off around a zero transition of the alternating voltage is preferably selected to be zero or minimal.

In accordance with yet another mode of the invention, since, depending on the dimensioning of the circuit components of the inverter, its efficiency decreases again from a certain output power, the power switching elements are preferably activated in the peak-load range of the inverter in such a manner that the current generated at the alternating-voltage terminals has the shape of a flattened sinusoidal curve.

In accordance with yet a further mode of the invention, the frequency of the high-frequency clocking of the power switching elements of the inverter is matched to a root-mean-square value of the current generated at the alternating-voltage terminals.

In accordance with yet an added mode of the invention, the power switching elements of the inverter are activated in such a manner that the current generated at the alternating-voltage terminals has a curve shape with few harmonics.

In accordance with yet an additional mode of the invention, the method of the invention described above is of advantage, in particular, when used for a transformerless inverter. In principle, however, the method can also be used with inverters having a transformer. However, due to the power losses caused by the transformer, it is not as effective in this case as with a transformerless inverter.

In accordance with again another mode of the invention, the method of the invention described above is also of advantage when used for an inverter for feeding current into an alternating-voltage system. However, the method can also be used similarly with an inverter for supplying power directly to loads.

In accordance with again a further mode of the invention, the method of the invention described above is preferably used for an inverter, at the direct-voltage terminals of which a photovoltaic direct-voltage source, a fuel cell, a battery or the like is connected.

In accordance with a concomitant mode of the invention, in principle, the method of the invention described above can be advantageously used for all types of inverters, particularly also for inverters in which the power switching elements contain half- or full-bridges, reverse converters, boost choppers, buck choppers, Cuk converters or Sepic converters or the like.

Other features which are considered as characteristic for the invention are set forth in the appended claims.

Although the invention is illustrated and described herein as embodied in a method for operating an inverter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the text which follows, the invention will be explained by using the example of a single-phase transformerless inverter for transforming electrical direct voltage of a direct-voltage source into alternating voltage for feeding energy into an alternating-voltage system of the same phase and a without phase shift between voltage and current.

However, the present invention is not restricted to this application only. The method according to the invention is similarly suitable for feeding into systems with 50 Hz, 60 Hz or 400 Hz with single-phase and multi-phase inverters, with transformerless inverters and inverters with transformers. The inverter also does not necessarily need to be used for feeding energy into an alternating-voltage system, rather the method according to the invention can also be advantageously used for inverters which are a component of an alternating-current source for directly supplying loads.

Figure 1:
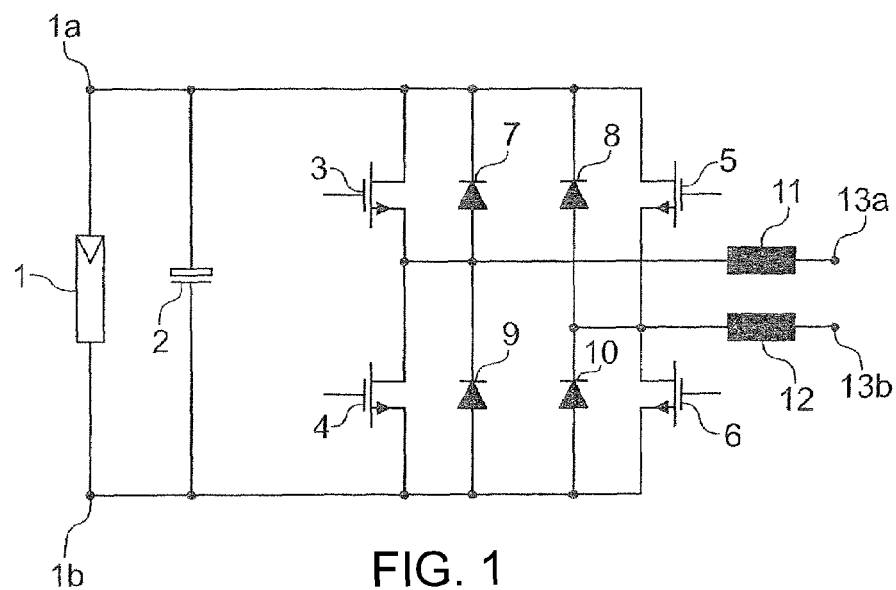
FIG. 1 is a schematic diagram of a circuit topology of a bridge-connected single-phase transformerless inverter in which the method of the invention can be applied.

Referring now to the figures of the drawings in detail and first, particularly, to FIG. 1 thereof, there is seen a known circuit topology of a bridge-connected single-phase transformerless inverter. A direct-voltage source 1 such as, for example, a photovoltaic direct-voltage source, a fuel cell, a battery or the like, is connected at two direct-voltage terminals 1a and 1b of the inverter. The inverter converts the direct voltage present at the direct-voltage terminals 1a, 1b into an alternating voltage and feeds electrical energy through two alternating-voltage terminals 13a and 13b into an alternating-current system with, for example, 50 Hz, 60 Hz or 400 Hz of the same phase and a current without a phase shift.

The inverter contains a buffer capacitor 2 connected in parallel with the direct-voltage source 1 and a bridge circuit formed of four power switching elements 3 to 6. The power switching elements 3 to 6 are constructed as high-frequency switches which are suitable for switching processes up to a few 100 kHz. Freewheeling diodes 7 to 10, which are each connected in parallel with a respective one of the power switching elements 3 to 6, accept the current during commutation phases of the power switching elements 3 to 6. The alternating-voltage terminals 13a, 13b are each associated with a respective choke 11 and 12. The chokes 11, 12 provide for a sinusoidal current with little ripple at the alternating-voltage terminals 13a, 13b. For better clarity, further components such as, for example, filters for improving electromagnetic compatibility, have been omitted in FIG. 1.

In order to convert the direct voltage present at the direct-voltage terminals 1a, 1b into an alternating current to be fed into a system through the alternating-voltage terminals 13a, 13b, the power switching elements 3 to 6 are opened and closed in a mutually matched manner with certain high-frequency clock patterns. As a result, voltage pulses which can be distinguished from one another discretely in time are generated, and the potential level thereof is matched to the system voltage. During a positive half wave, for example, the two power switching elements 3 and 6 are activated with a high-frequency clock and different pulse widths and during a negative half wave it is the power switching elements 4 and 5 which are activated. In order to generate, control and regulate the variation with time of the high-frequency clocking of the power switching elements 3 to 6, it is possible to use both hardware circuits and software with digital signal processors.

The method according to the invention for operating such an inverter (as an example of an inverter) will now be described in detail through the use of various illustrative embodiments, referring to FIGS. 2 to 5.

Figure 2:
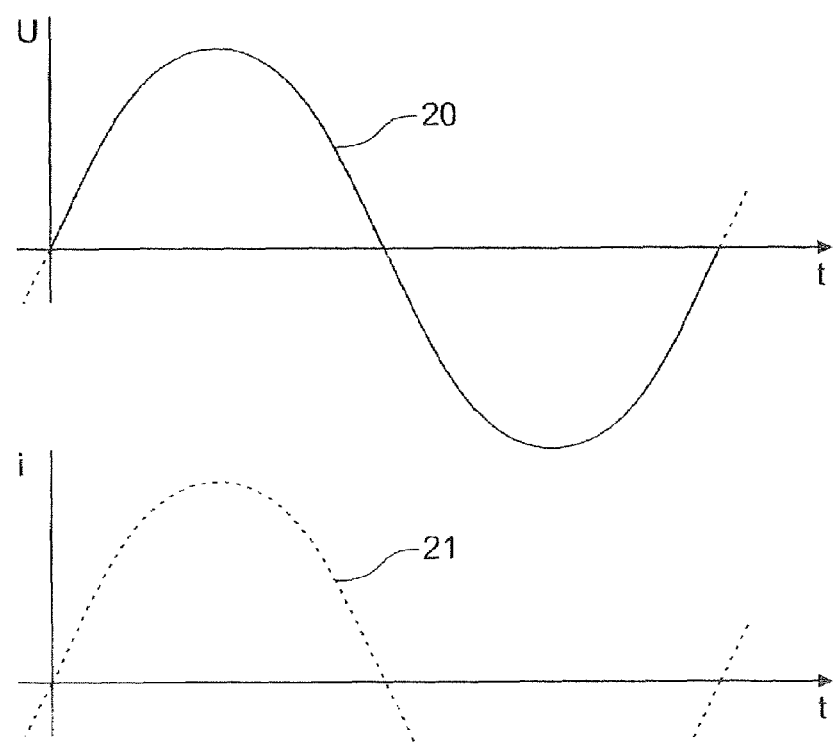
FIG. 2 includes two diagrams showing variations with time of alternating voltage and alternating current in an ideal case.

FIG. 2 shows that a current i generated at the alternating-voltage terminals 13a, 13b of the inverter (curve 21) and a voltage U present there (curve 20) are almost sinusoidal and in phase with one another in the ideal case. If the inverter is connected for feeding electrical energy into an alternating-current system, the voltage U present at the alternating-voltage terminals 13a, 13b corresponds to the system voltage.

Figure 3:
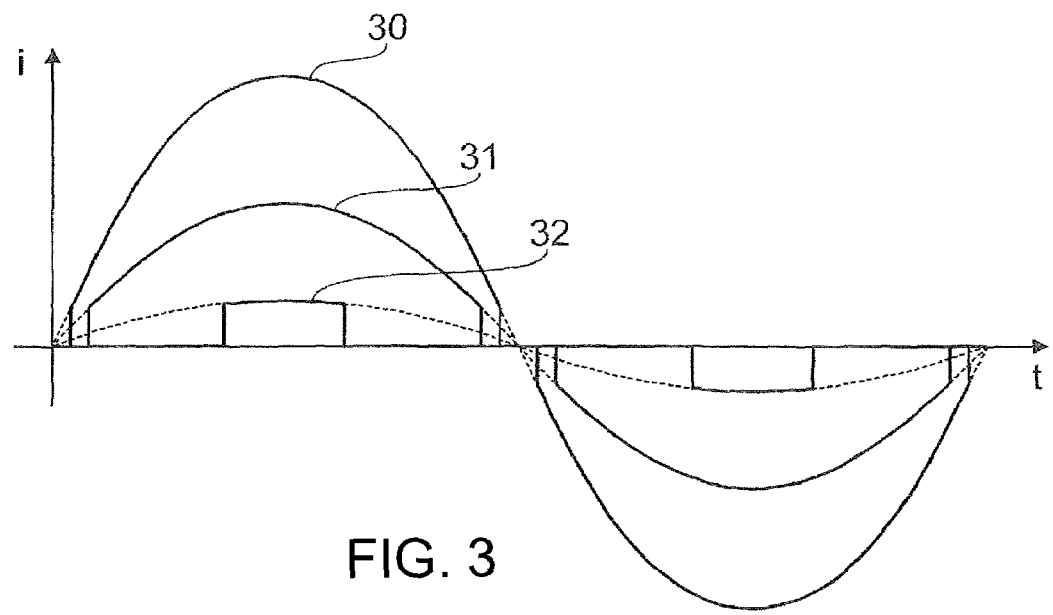
FIG. 3 is a diagram showing variations with time of alternating currents for three different output powers of the inverter according to a first illustrative embodiment of the invention.

FIG. 3 shows the current variation at the output of the inverter according to the method of the invention for three different output powers in the partial-load range. In the case of a very low power fed into the system, the current i only flows in the range of the maximum sinusoidal voltage of the system (curve 32). Before and after the zero transitions of the system voltage, the high-frequency clocking for the four power switching elements 3 to 6 is respectively switched off or suppressed. The chokes 11, 12 of the alternating-voltage outputs 13a, 13b are thus decoupled from the direct-voltage source 1 and the buffer capacitor 2. No current flows either through the chokes 11, 12 or through the power switching elements 3 to 6, i.e. the power section of the inverter does not consume any power in this operating range in which the inverter actually has a low efficiency, as described above. When the clocking is switched on in the range of the maximum sinusoidal voltage, the current then flows with an acceptable efficiency of the inverter.

With a mean power fed into the system by the direct-voltage source 1, the current i flows with a good efficiency over a much greater period (curve 31). In the case of the current curve 30, for an even higher output power of the inverter, the power switching elements 3 to 6 are now interrupted for only a short time around the zero transition of the system voltage.

The power which is respectively fed into the system or generated at the alternating-voltage terminals 13a, 13b, is proportional to the current i which is respectively fed in or generated. With a low current in the vicinity of the zero transitions of the sinusoidal wave, the instantaneous efficiency of the inverter is poor since the transmitted power is low in comparison with the losses due to the high-frequency clocking in the power switching elements 3 to 6 and the chokes 11, 12. This particularly applies in the partial-load range of the inverter. According to the invention, therefore, the high-frequency clocking of the inverter with its losses is suppressed or switched off for a shorter or longer time around the zero transitions of the alternating voltage U as a function of the respective current or of the output power of the inverter so that the range of poor efficiency is blanked out.

The current i generated at the alternating-voltage terminals 13a, 13b is therefore no longer sinusoidal as shown in FIG. 3. However, the system half wave in the center of a system half wave is correspondingly larger in order to transmit the same total power. Due to the better efficiency of the inverter in this range, an output power of the inverter which is higher overall is thus achieved.

The method for operating an inverter illustrated in FIG. 3 also achieves a good efficiency in the partial-load range. The hard starting and stopping of the current i according to the curves 30 to 32 during the system half waves, however, creates harmonics which are unwanted.

Figure 4:
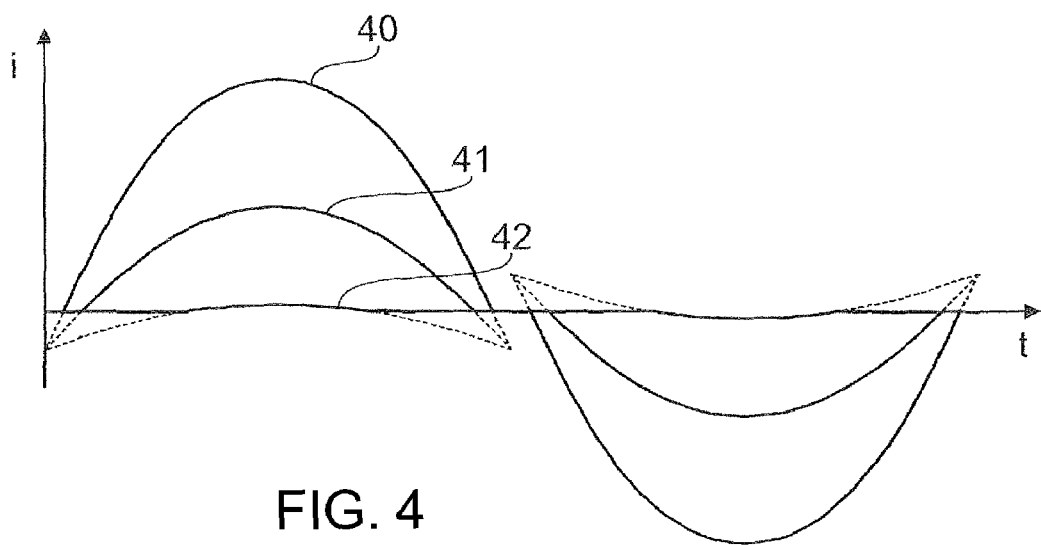
FIG. 4 is a diagram showing variations with time of alternating currents for three different output powers of the inverter according to a second illustrative embodiment of the invention.

FIG. 4 therefore shows a further illustrative embodiment of a method for operating an inverter. The method operates in accordance with the same basic principle as the method described above. i.e. the high-frequency clocking of the inverter is switched off or suppressed for a shorter or longer time around the zero transitions of the alternating voltage as a function of the respective current or of the output power of the inverter in order to blank out the range of poor efficiency. In contrast to the first illustrative embodiment, however, current curves 40, 41, 42 follow the slope of the alternating voltage in the range of starting and stopping. This current shape can be implemented with simple circuits and operates much more advantageously with respect to the generation of harmonics. The power switching elements 3 to 6 could also be optionally activated in such a manner that the current generated at the alternating-voltage terminals 13a, 13b changes with the slope of the square of the curve of the voltage present at the alternating-voltage terminals.

The two illustrative embodiments explained with reference to FIGS. 3 and 4 in each case relate to the operation of an inverter in its partial-load range. Depending on the dimensioning of the power switching elements 3 to 6 and of the chokes 11, 12, however, the efficiency of the inverter drops again from a certain transmitted power.

Figure 5:
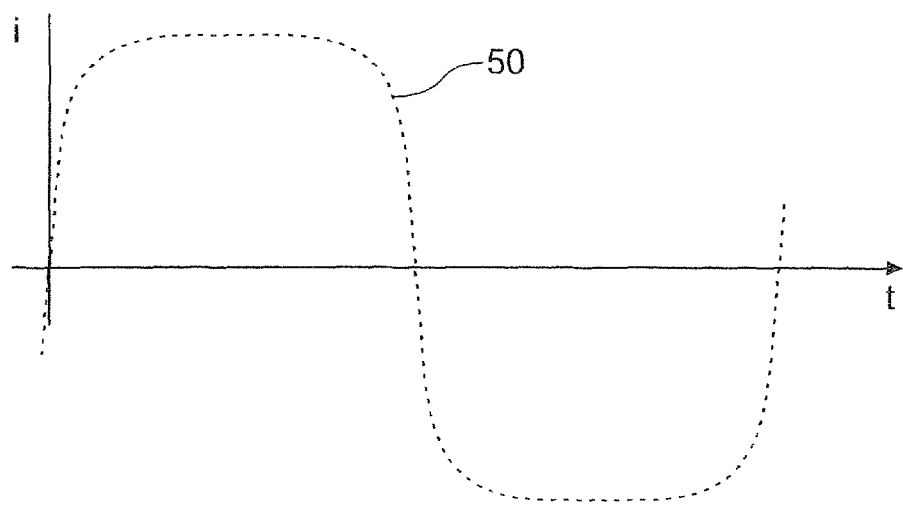
FIG. 5 is a diagram showing a variation with time of an alternating current in the case of the peak-load range of the inverter according to a further illustrative embodiment of the invention.

In order to achieve a good efficiency even with a peak load of the inverter, a current curve shape 50 illustrated in FIG. 5 is proposed. Due to the rapidly rising current i after the zero transition of the alternating voltage, good instantaneous values are quickly achieved for the efficiency of the inverter in the peak-load range. The period during which the high-frequency clocking of the power switching elements 3 to 6 is switched off around a zero transition of the alternating voltage is therefore preferably selected to be minimal or as zero in the peak-load range of the inverter.

In the remaining range, the peak value of the current i remains below the sinusoidal curve for the same transmitted power. In other words, the high-frequency clocking of the power switching elements 3 to 6 is controlled in the peak-load range of the inverter in such a manner that a current curve 50 in the form of a flattened sinusoidal curve is obtained. In this manner, the instantaneous efficiency is also improved during the peak values of the alternating voltage.

The method for operating an inverter described above is particularly advantageously applicable with an inverter for feeding energy generated by a photovoltaic direct-voltage source into an alternating-current system without it being intended for the present invention to be restricted to this special application.

The invention claimed is:
1. A method for operating an inverter for converting direct voltage into alternating voltage, the method comprising the following steps:

providing two direct-voltage terminals, two alternating-voltage terminals and a plurality of power switching elements clocked at high-frequency and connected between the two direct-voltage terminals and the two alternating-voltage terminals; and switching off the high-frequency clocking of the power switching elements of the inverter at each zero transition of the alternating voltage for a period depending on at least one of a direct voltage present at the direct-voltage terminals of the inverter or an output power of the inverter.

2. The method according to claim 1, which further comprises, in a partial-load range of the inverter, selecting the period, during which the high-frequency clocking of the power switching elements is switched off around a zero transition of the alternating voltage, to become longer as the output power of the inverter becomes lower.

3. The method according to claim 1, which further comprises, in a partial-load range of the inverter, activating the power switching elements to cause a current generated at the alternating-voltage terminals to change with a slope of a curve of a voltage present at the alternating-voltage terminals.

4. The method according to claim 1, which further comprises, in a partial-load range of the inverter, activating the power switching elements to cause a current generated at the alternating-voltage terminals to change with a slope of a square of a curve of a voltage present at the alternating-voltage terminals.

5. The method according to claim 1, which further comprises switching off the high-frequency clocking of the power switching elements of the inverter around a zero transition of the alternating voltage with equally long time intervals for rising and falling edges.

6. The method according to claim 1, which further comprises switching off the high-frequency clocking of the power switching elements of the inverter around a zero transition of the alternating voltage with differently long time intervals for rising and falling edges.

7. The method according to claim 1, which further comprises, in a peak-load range of the inverter, selecting the period, during which the high-frequency clocking of the power switching elements is switched off around a zero transition of the alternating voltage, to be minimal or zero.

8. The method according to claim 1, which further comprises, in a peak-load range of the inverter, activating the power switching elements to cause a current generated at the alternating-voltage terminals to have a shape of a flattened sinusoidal curve.

9. The method according to claim 1, which further comprises matching the frequency of the high-frequency clocking of the power switching elements of the inverter to a root-mean-square value of a current generated at the alternating-voltage terminals.

10. The method according to claim 1, which further comprises activating the power switching elements of the inverter to cause a current generated at the alternating-voltage terminals to have a curve shape with few harmonics.

11. The method according to claim 1, wherein the inverter is a transformerless inverter.

12. The method according to claim 1, wherein the inverter feeds current into an alternating-voltage system.

13. The method according to claim 1, which further comprises connecting a photovoltaic direct-voltage source, a fuel cell or a battery at the direct-voltage terminals.

14. The method according to claim 1, wherein the power switching elements contain half- or full-bridges, reverse converters, boost choppers, buck choppers, Cuk converters or Sepic converters.

15. A method for operating an inverter for converting direct voltage into alternating voltage, the method comprising the following steps:
    providing two direct-voltage terminals, two alternating-voltage terminals and a plurality of power switching elements clocked at high-frequency and connected between the two direct-voltage terminals and the two alternating-voltage terminals; and
    switching off the high-frequency clocking of the power switching elements of the inverter around a zero transition of the alternating voltage for a period depending on an average output power of the inverter.

16. A method for operating an inverter for converting direct voltage into alternating voltage, the method comprising the following steps:
    providing two direct-voltage terminals, two alternating-voltage terminals and a plurality of power switching elements clocked at high-frequency and connected between the two direct-voltage terminals and the two alternating-voltage terminals; and
    switching off the high-frequency clocking of the power switching elements of the inverter around a zero transition of the alternating voltage for a period depending on a direct voltage present at the direct-voltage terminals of the inverter.

17. The method of claim 15, wherein the switching off the high-frequency clocking of the power switching elements of the inverter occurs at each zero transition of the alternating voltage.

18. The method of claim 16, wherein the switching off the high-frequency clocking of the power switching elements of the inverter occurs at each zero transition of the alternating voltage.

* * * * *